(No Model.) 4 Sheets—Sheet 2.

T. R. HOUSEMAN & C. B. M. SPROWLES.
MACHINE FOR DRYING AND PRESSING TALLOW RENDERING.

No. 361,789. Patented Apr. 26, 1887.

WITNESSES: INVENTOR (No Model.) 4 Sheets—Sheet 3.

T. R. HOUSEMAN & C. B. M. SPROWLES.
MACHINE FOR DRYING AND PRESSING TALLOW RENDERING.

No. 361,789. Patented Apr. 26, 1887.

WITNESSES: INVENTOR (No Model.) 4 Sheets—Sheet 4.

T. R. HOUSEMAN & C. B. M. SPROWLES.
MACHINE FOR DRYING AND PRESSING TALLOW RENDERING.

No. 361,789. Patented Apr. 26, 1887.

UNITED STATES PATENT OFFICE.

THOMAS R. HOUSEMAN AND CHRISTIAN B. M. SPROWLES, OF PHILADELPHIA, PENNSYLVANIA.

MACHINE FOR DRYING AND PRESSING TALLOW RENDERING.

SPECIFICATION forming part of Letters Patent No. 361,789, dated April 26, 1887.

Application filed September 23, 1886. Serial No. 214,360. (No model.)

*To all whom it may concern:*

Be it known that we, THOMAS R. HOUSEMAN and CHRISTIAN B. M. SPROWLES, citizens of the United States, residing at Philadelphia, in the county of Philadelphia and State of Pennsylvania, have invented certain new and useful Improvements in Machines for Drying and Pressing the Residuum from Tallow Rendering; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to machines for drying and pressing the material or residuum from steam tallow-rendering establishments, commonly known as "tankage," and for obtaining therefrom all oil or fat that may be contained therein. When treating this residuary matter in the ordinary manner, an offensive stench is emitted, making it practically impossible to carry on the business in thickly-settled districts.

Our invention is to overcome this difficulty and obtain from said residuum all oil therein.

The following detailed description of the apparatus and operation by which we accomplish the object of this invention will more fully explain its nature and functions.

The accompanying drawings illustrate what we consider the best means for carrying our invention into practice.

Figure 1:
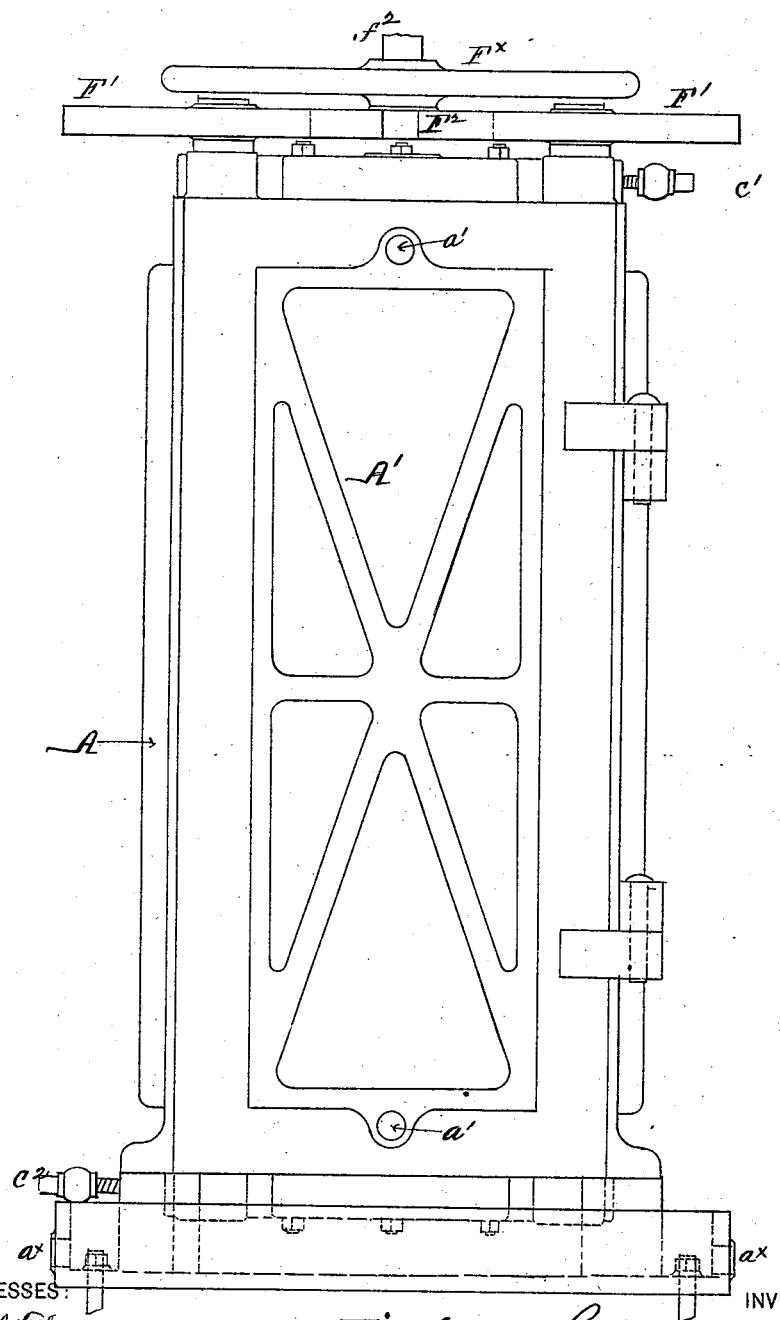
Figure 2:
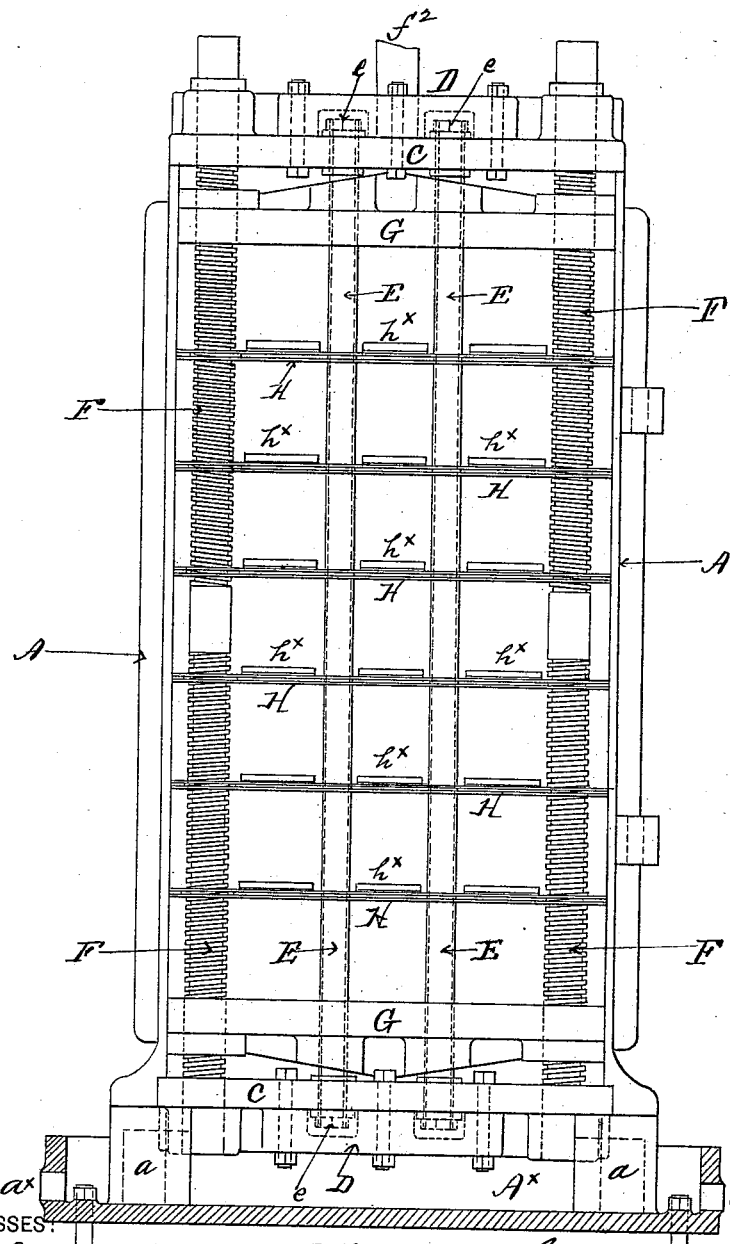
Figure 3:
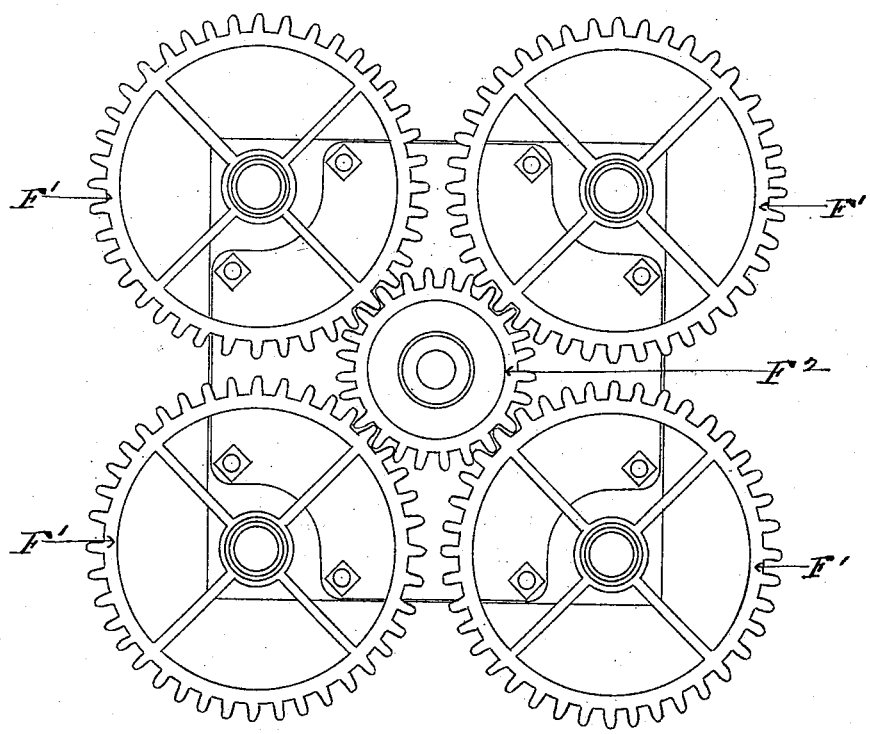
Figure 4:
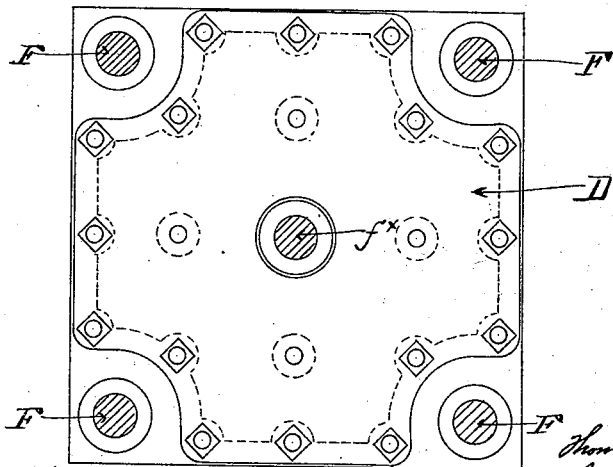
Figure 5:
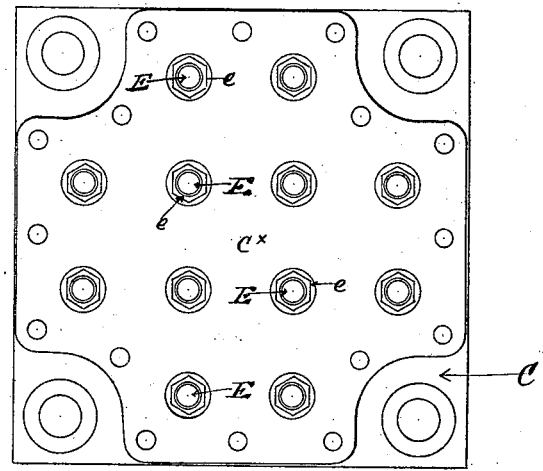
Figure 6:
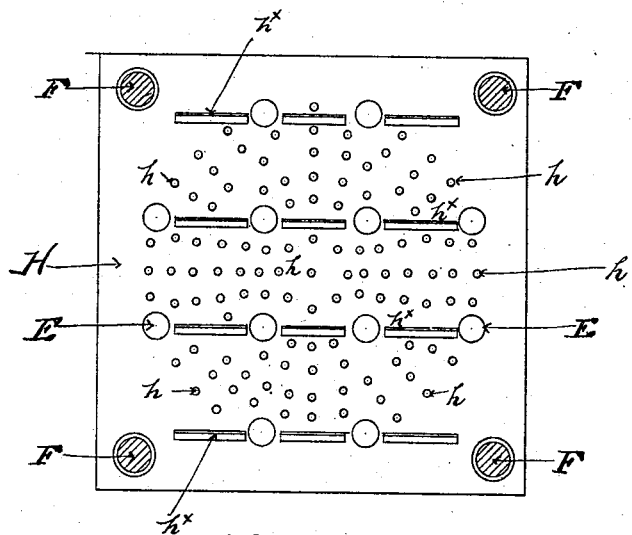

Figure 1 is a front elevation of the apparatus, showing the door closed. Fig. 2 is a similar view showing the door removed and omitting the gearing on top. Fig. 3 is a plan view of the device with the band-wheel removed. Fig. 4 is a plan view of the top of the case, showing the shafts or studs on which the gear-wheels work in section. Fig. 5 is a plan view of a plate lying immediately under the plate shown in Fig. 4. Fig. 6 is a plan view of one of the fat-shelves or diaphragms.

Similar letters of reference indicate corresponding parts in all the figures where they occur.

A is the case or housing of the apparatus, which forms the pressing cage or shell. It is provided with a door, A', which is hinged to it, preferably at one corner, and fits snugly against one side, and is securely fastened in any convenient manner. This case or cage A rests upon studs $a$ in a drip-pan, $A^\times$. The cage is provided with egress-passages $a'$ and the pan with openings $a^\times$. The top and bottom of the cage are closed by means of plates C C and D D. The plates C C are interior and the plates D D exterior. These pairs of plates fit together along their edges all around, but have a hollow space, $C^\times$, in one or the other of the plates. This space is for the reception of steam or hot air.

Tubes or pipes E E, &c., traverse the length of the apparatus and terminate in the spaces $C^\times$ at bottom and top, where they are fitted with nuts $e\ e$, which rest over the inner plates, C C, and serve to clamp these plates together, and at the same time the pipes permit the passage of the steam or other drying-fluid. Spaces $C^\times\ C^\times$ are supplied with ingress and egress ports, as shown at $c'\ c^2$, the steam preferably entering the upper port, $c'$, and escaping through the lower port, $c^2$. The plates C D are bolted or otherwise suitably secured together.

Screw-shafts F F F F are provided, preferably one at each corner of the case, and held with freedom to rotate in the plates C C D D. One half of these shafts is screw-threaded in one direction, while the other half or end is screw-threaded in the opposite direction. The shafts are operated in unison by means of the gears F' F' F' F' on their upper ends, which mesh into a central gear, $F^2$, mounted upon the stud $f^2$, and equipped with a hand-wheel or other turning or power-applying means, $F^\times$. The shafts F pass through threaded openings in the squeezing-plates G G, which are mounted at bottom and top of the case and are caused to approach or recede from each other with uniform motion, according as the threaded shafts are turned in one direction or the other.

Between the squeezing-plates G G are mounted loose upon the shafts F F a series of compartment or partition plates or disks or diaphragms, H H, &c. These diaphragms H are provided with some suitable means for being lodged or held at any height on the shafts, when required. I have not deemed it necessary to show any specific holding means, as it is evident that simply a key wedged in between the shaft and diaphragms will answer the purpose.

The diaphragms H are formed of two plates or thicknesses of material bolted or otherwise held at a little distance apart, as shown, thus leaving a space between them. The two plates forming the diaphragms are perforated, as shown at $h\, h$, &c., which permit all watery and fatty matter to percolate through them and run off down the sides of the shell or case. The tops of the diaphragms are also provided with cutting edges or projections $h^\times$, which enter the body of the fats placed between the diaphragms. Any watery or fluid matter pressed out of the fats through apertures $h$ will find its way to the sides of the machine through the space between the plates, and thence escape. The steam-pipes E pass through these diaphragms H, as well as through the squeezing-plates G, and diffuse the heat and curing qualities of the steam through the entire mass of fats.

When fats are to be placed in the apparatus for treatment, the door is opened and a sufficient quantity of fats placed upon the lower squeezing-plate, the diaphragms being held up on the screw-shafts in the manner above described. When a covering of fats is in place on the lower squeezing-plate, the next diaphragm is let down upon it, and a similar thickness or covering of fats is placed upon this first diaphragm, and the next diaphragm is let down upon this layer of fats, and so on until all the compartments or spaces made by the diaphragms between the upper and lower squeezing-plates are filled with about an equal quantity of fats, so that the diaphragms and squeezing-plates will occupy about the relative distances apart shown in Fig. 2. Of course, if it is desired to treat a smaller amount of fats, fewer of the compartments may be used or thinner layers of fats placed upon the partitions. When the fats are thus in place, the door is closed, steam turned on, and power applied to part $F^\times$. The combined action of the pressure from both ends of the case and the passage of steam through the pipes is to drive and squeeze out all watery and fatty matter and to thoroughly cure the fats, so that when the fats are removed it will be found that they are converted into cured cracklings.

The steam may be permitted to flow through the pipes for any desired length of time and the compressing force applied at intervals to properly squeeze the fats.

Having thus described our invention, what we claim, and desire to secure by Letters Patent, is—

1. In an apparatus for treating fats, the combination, with a suitable housing or case, of squeezing-plates and means for causing them to mutually approach each other, and pipes having an active circulation for hot air or steam passing through the said plates and traversing the space between them.

2. In an apparatus for treating fats, the combination, with a suitable housing or case, of squeezing-plates and means, substantially as described, for operating them, and intermediate diaphragms having cutting-edges projecting above their face, as set forth.

3. In an apparatus for treating fats, the combination, with the means for holding the fats, of a series of steam-pipes passing through the fat-containing chamber or chambers and a common steam-space at each end of the pipes, as set forth.

4. In an apparatus for treating fats, the combination, with the housing or case and ends thereof, of the steam-pipes passing through one layer of said ends and provided with nuts, as described, said pipes thereby serving the double function of steam-conveyers and holding-rods, as set forth.

5. In an apparatus for treating fats, the combination, with the housing or case, of the double ends thereof having steam-spaces between them, the steam-pipes extending from end to end and provided with nuts on the ends between the plates, and the supply and escape passages, all substantially as and for the purpose set forth.

6. In an apparatus for treating fats, the combination of the housing or case provided with escape-openings, as described, and the squeezing devices and curing-fluid-conveying devices, substantially as described, and the drip pan or trough forming the base of said housing or case, as set forth.

In testimony whereof we affix our signatures in presence of two witnesses.

THOMAS R. HOUSEMAN.
CHRISTIAN B. M. SPROWLES.

Witnesses:
FREDK. J. LAMBERT,
THOS. D. MOWLDS.